United States Patent [19]

Matsumoto

[11] Patent Number: 5,913,762
[45] Date of Patent: Jun. 22, 1999

[54] WEATHERSTRIP FOR MOTOR VEHICLE SIDE WINDOWS

[75] Inventor: Atsushi Matsumoto, Nagoya, Japan

[73] Assignee: Tokai Kogyo Co., Ltd., Aichi Ken, Japan

[21] Appl. No.: 08/746,716

[22] Filed: Nov. 15, 1996

[30] Foreign Application Priority Data

Dec. 28, 1995 [JP] Japan .................................. 7-352283

[51] Int. Cl.⁶ ...................................................... B60J 1/16
[52] U.S. Cl. .............................................................. 49/377
[58] Field of Search .......................... 49/377, 374, 495.1, 49/493.1, 490.1, 475.1

[56] References Cited

U.S. PATENT DOCUMENTS

| | | | |
|---|---|---|---|
| 5,170,586 | 12/1992 | Ose et al. ................................. | 49/377 |
| 5,261,188 | 11/1993 | Vaughan .................................. | 49/377 |
| 5,267,415 | 12/1993 | Vaughan .................................. | 49/377 |
| 5,363,537 | 11/1994 | Schneider et al. ..................... | 49/377 X |
| 5,433,038 | 7/1995 | Dupuy ..................................... | 49/377 |
| 5,671,565 | 9/1997 | Furuse .................................... | 49/377 |

FOREIGN PATENT DOCUMENTS 57-125634   8/1982   Japan .

*Primary Examiner*—Jerry Redman
*Attorney, Agent, or Firm*—Howson and Howson

[57] ABSTRACT

A weatherstrip for the side window of a motor vehicle comprises an elongated molding portion for attachment to the door of the vehicle, an elongated resilient sealing lip, secured to the molding portion, for engaging the glass portion of the door, and clips for securing the molding portion to the door. The clips and the molding portion are formed by injection molding as a unitary molded part, and the resilient lip, made of an elastomer, is formed onto the molding portion by injection molding.

10 Claims, 4 Drawing Sheets

WEATHERSTRIP FOR MOTOR VEHICLE SIDE WINDOWS

SUMMARY OF THE INVENTION

This invention relates generally to a weatherstrip for sealing the gap between the inner lining of a motor vehicle door and the sliding glass of the door window.

A side door of an automobile or other motor vehicle ordinarily comprises a window having a pane of glass which slides vertically upward from a storage space within the metal structure of the door. A weatherstrip is provided to prevent the entry of rainwater, noise, etc. into the interior of the vehicle. The weatherstrip is usually fastened to a door panel or to the door trim. As it is an exterior part, it is important that it not impair the external appearance of the vehicle.

A conventional automotive weatherstrip consists of two parts, a molding portion for attachment to a door panel or trim, and a lip portion for engagement with the window glass. Both portions are extruded parts, which after extrusion, are cut to the appropriate length and secured together.

Several problems are encountered in the manufacture and installation of the conventional weatherstrip. Following its extrusion, the molding portion goes through various processes requiring significant amounts of time and labor. It must be subjected to a stretch bending process. In addition, after the molding portion is cut to a specific length, it must be fitted with end caps to keep out rainwater. Furthermore, as the weatherstrip is normally secured to the door panel or trim by an adhesive, a significant amount of time and labor is required for its installation.

It is an object of this invention to avoid the aforementioned problems encountered in the manufacture and installation of weatherstrips for motor vehicles. In particular, it is an object of the invention to avoid the stretch bending and various other time-consuming and labor-intensive steps in the manufacturing process. It is also an object of the invention to simplify the installation of the weatherstrip.

In accordance with the invention, integrally molded clips are formed on the molding portion for fastening the weatherstrip to a motor vehicle door, and the lip portion of the weatherstrip is injection molded as one body with a molding portion. Thus, in the manufacture of the weatherstrip, the molding portion of the weatherstrip is made by injection molding, with the clips being formed in the same injection molding step so that the clips and the molding portion are formed as a molded unit. Thereafter, the molding portion, which includes the clips, is inserted into a lip-forming mold. Then a molding material, preferably an elastomeric material, is injected into the lip-forming mold, and the lip portion and the molding portion are molded together en bloc. The ends of the lip-forming mold are shaped to form the ends of the lip portion of the weatherstrip to accommodate a door mirror base and the center pillar of the door.

In the installation of the weatherstrip, the integrally molded clips retain the molding portion on the door, and the lip portion, which is an elastomer, bears resiliently against the window glass.

Further objects, details and advantages of the invention will become apparent from the following detailed description, when read in conjunction with the drawings.

DESCRIPTION OF THE DRAWINGS

in FIG. 1.

DETAILED DESCRIPTION

Figure 9:
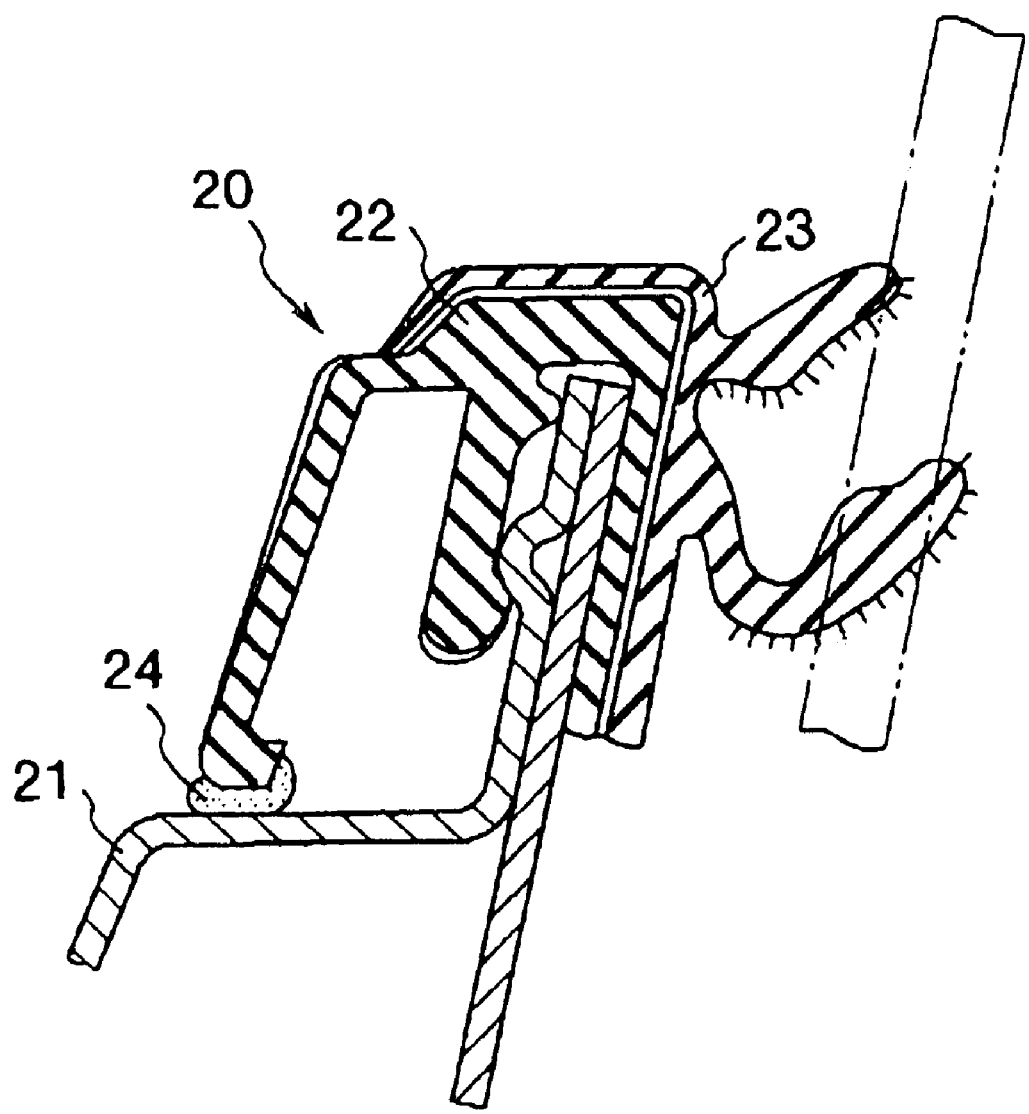
FIG. 9 is a cross-sectional view of a conventional weatherstrip in the prior art.

The conventional weatherstrip 20 shown in FIG. 9 corresponds the weatherstrip described in Japanese laid-open Utility Model application Sho 57-125634 (1982). The weatherstrip has a molding portion 22 attached to a door panel 21 by an adhesive 24, and a lip portion 23 secured to the molding portion. The molding portion 22 and the lip portion are both extruded parts, which are cut to a specific length after extrusion. As mentioned previously, weatherstrip 20 requires a stretch bending process after extrusion, and must be fitted with end caps (not shown) to prevent entry of rainwater. Moreover, because the extruded molding portion of the weatherstrip requires adhesive for attachment to the door panel, considerable time and labor are required for installation.

Referring now to FIGS. 1 and 2–8, the weatherstrip 40 of the invention comprises a molding portion 41 and a lip portion 42. The molding portion is an elongated member with an optional hollow interior space 43, as shown in FIGS. 2–8.

Figure 6:
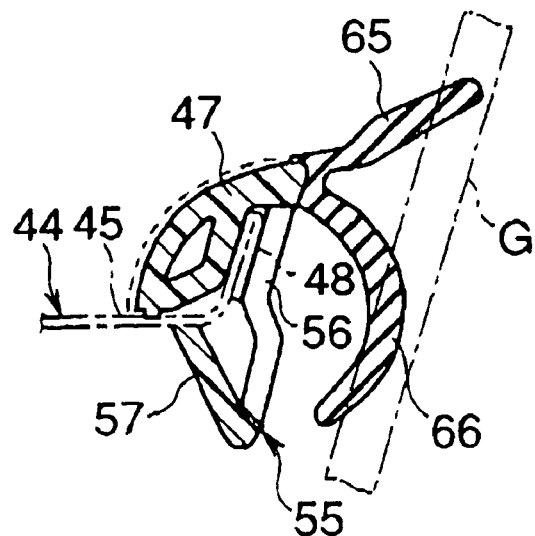
Figure 7:
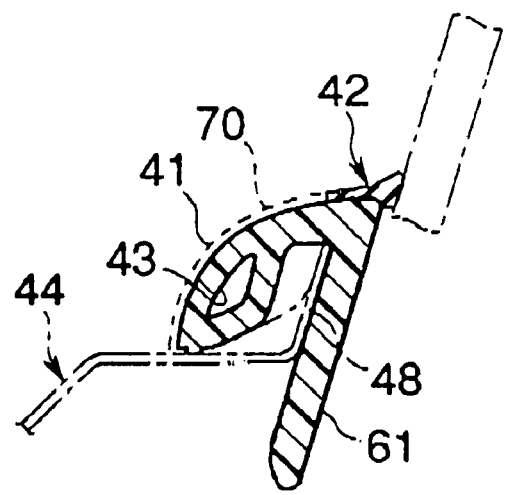

The molding portion 41 has a decorative section 47, which is shaped to fit the contour of a recessed section 45 of a door panel 44, as shown in FIG. 6. The decorative portion is formed throughout the entire length of the molding portion 41 so that it covers flange 48 of the door panel 44.

Figure 1:
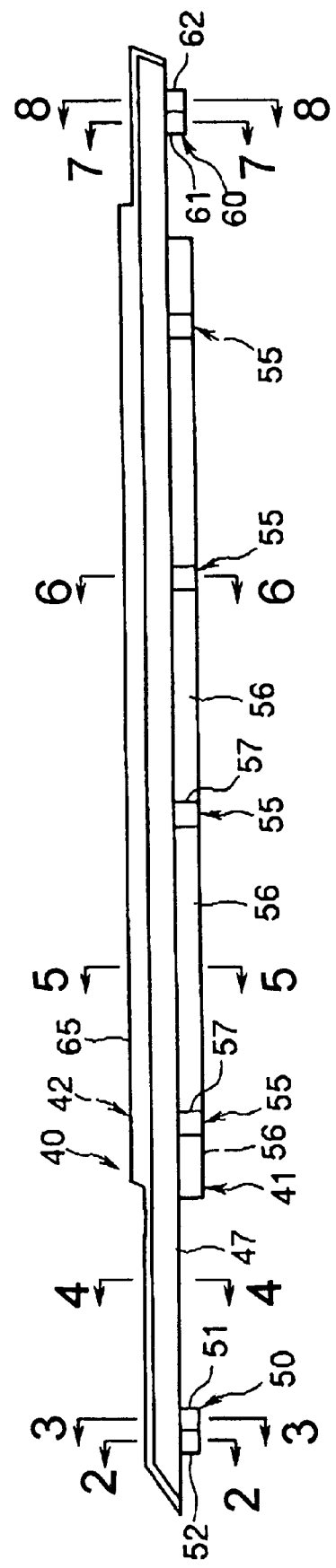
FIG. 1 is a front elevational view of a preferred weatherstrip in accordance with the invention.
Figure 2:
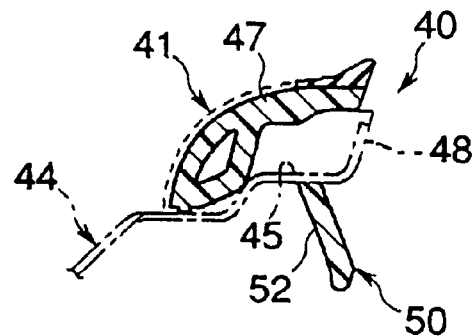
FIGS. 2–8 are respectively transverse cross-sections taken on the planes 2—2, 3—3, etc.
Figure 3:
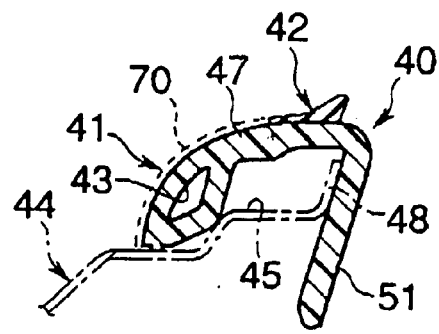
Figure 4:
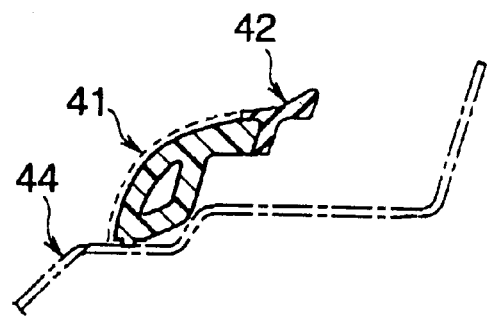

One of the clips, 50, is shown at the left-hand end of FIG. 1 and in FIGS. 2 and 3. This end clip is composed of a first tongue 51 extending downward from decorative section 47 in parallel with flange 48, as shown in FIG. 3, and a second tongue 52, shown in FIG. 2, which is formed as a unit with tongue 51. The lower part of the second tongue is situated alongside the tip of tongue 51. Tongue 52 is connected to the tip of tongue 51, and extends upward, as shown in FIG. 2, to engage the underside of recessed section 45 of the door panel.

Four longitudinally spaced intermediate clips 55 are integrally formed on the decorative section 47. As shown in FIG. 6, each intermediate clip 55 is composed of a tongue 57 which is molded as a unit with an elongated belt-like member 56 which extends generally parallel to the window glass G. The tongues 57 are disposed in interruptions in the belt-like member 56, and extend upward from the tip of the belt-like member to contact the underside or the recessed section 45 of the door panel 44.

Figure 8:
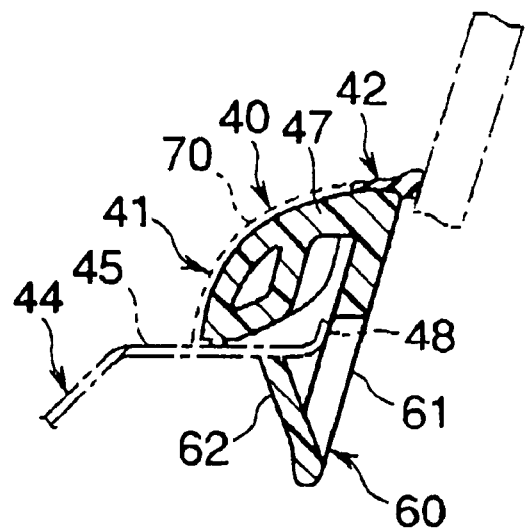

An end clip 60 is provided at the right-hand end of the decorative section, as shown in FIG. 1. This end clip, as shown in FIG. 8, is composed of a first tongue 61 extending downward from decorative section 47 in parallel with the flange 48 and a second tongue 62 extending upward from the tip of tongue 61, and engaging the underside of recessed section 45 of the door panel 44. As in the case of clip 50, the lower part of the second section of the clip is situated alongside the tip of the first section and is molded as a unit with the first section.

Figure 5:
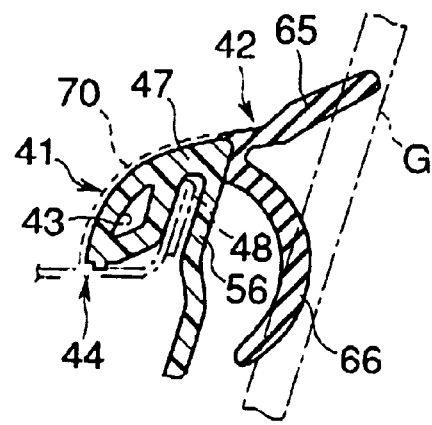

The length of the lip portion 42 is nearly the same as the length of the molding section 41. As shown in FIG. 5, in the intermediate part of the weatherstrip along its length, an upward lip 65 and a downward lip 66 are formed as a unit. The lip portion 42 is preferably produced from an elastic material, such as a thermoplastic or thermosetting elastomer, which is slippery on window glass. The lips of the lip portion 42 resiliently bear against the window glass G.

The weatherstrip is installed on the door panel 44 so that the flange 48 of the door panel is received between the belt-like member 56 and the molding portion 41, as shown in FIGS. 5 and 6. The door panel 44 is thus engaged by the upward tongues 52, 62 and 57 and by the lower part of the molding portion 41.

In the manufacture of the weatherstrip, the molding portion 41 is made by injection molding in a mold (not shown). The end clips 50 and 60 and the intermediate clips 55 are formed in this injection molding step as a unit with the molding portion. By gas-assisted injection molding, the molding portion 41 can be made hollow so that the molding portion is thick enough to occupy the recess in the door panel without excessive material being required.

After the molding portion 41 is completed, the molding portion, with its integrally formed clips, is inserted into another injection mold (not shown) for molding the lip portion. A flexible material, such as an elastomer, is charged into the mold and the lip portion 42 is integrally molded to the molding portion. The lip portion covers the molding portion from end to end, and closes the hollow space 43, thereby preventing the entry of rainwater into the hollow space. The mold for molding the lip portion is so shaped as to ensure molding of the ends of the lip to conform to a door mirror base and a center pillar.

The weatherstrip 40, being injection molded, can be readily formed to conform to the door configuration and glass curvature, with a resulting enhancement of sealing performance over that of the conventional extruded weatherstrip.

A decorative film 70 may be laminated to the decorative section 47, as shown in FIGS. 3, 5, 7 and 8.

The advantages of the weatherstrip in accordance with the invention can be summarized as follows.

First, because the weatherstrip has clips which are integral with the molding portion and the lip portion, the weatherstrip can be installed easily, quickly and accurately without the need for an adhesive or separate fasteners.

Second, the sealing performance of the weatherstrip is superior to that of conventional weatherstrips because, by injection molding the weatherstrip can be made to conform closely to the door configuration and glass curvature. Injection molding allows the transverse cross-sections of both the molding portion and the lip portion to vary along their lengths as illustrated in FIGS. 2–8. Thus, the weatherstrip can easily be made to accommodate various shapes in the door panel and its trim, and other components including the base of the side mirror and the center pillar of the vehicle.

Third, gas-assisted injection molding makes it possible to produce an attractive, light-weight weatherstrip.

Fourth the appearance and value of the weatherstrip can be readily enhanced by laminating a decorative film on the outside surface of the molding portion.

Fifth, the lip portion, when produced from an elastomer, is capable of elastic deformation relative to the window glass against which it is pressed, allowing smooth vertical movement of the window glass.

Finally, injection molding of the clips as a unit with the molding portion, and integration of the lip portion with the molding portion in a second injection mold, not only greatly simplifies the manufacture of the weatherstrip, but also provides for improved quality and ease of installation.

Various modifications can be made to the weatherstrip described. For example, the molding portion can be made solid rather than hollow, and the shape of the molding portion as well as that of the lip portion can be modified as appropriate to accommodate various vehicle door and window configurations. The door window glass G, which is served by the weatherstrip may include both a fixed pane of glass and a vertically sliding pane, and the weatherstrip may be modified accordingly. These and other modifications can be made to the seal structure described without departing from the scope of the invention as defined in the following claims.

I claim:

1. In a vehicle door having interior and exterior sides and comprising an exterior door panel having a recess for receiving a decorative molding portion of a weatherstrip and a window located toward the interior side of the door relative to the exterior door panel, a weatherstrip for providing a water-tight seal between the door panel and the window, the weatherstrip comprising a decorative molding portion having clips fastening the decorative molding portion to the exterior door panel with the decorative molding located in said recess, and a sealing lip for engaging the window, wherein the clips are unitary with the decorative molding portion, the decorative molding portion and the clips consist of a first injection molded material, and the sealing lip is an injection molded material, different from said first material, and integrally joined, by molding, with the decorative molding portion, and wherein the decorative molding portion has an interior wall defining a hollow, gas-filled, interior space, said space being formed by gas-assisted injection molding.

2. A weatherstrip according to claim 1, having a film laminated on the outside surface of the decorative molding portion.

3. A weatherstrip according to claim 1, in which the sealing lip is made from an elastomer.

4. A weatherstrip according to claim 1, in which the decorative molding portion has an outside surface, and having a film laminated on the outside surface of the decorative molding portion.

5. A weatherstrip according to claim 1, in which the sealing lip is made from an elastomer.

6. A weatherstrip according to claim 1, in which the decorative molding portion has an outside surface, and having a film laminated on the outside surface of the decorative molding portion, and in which the sealing lip is made from an elastomer.

7. A weatherstrip according to claim 1 in which the decorative molding portion is elongated and in which the sealing lip is elongated and resilient.

8. A weatherstrip according to claim 7, in which both the decorative molding portion and the sealing lip are injection molded parts having transverse cross-sections which vary along their lengths.

9. A weatherstrip according to claim 7, in which the hollow, gas-filled, interior of the decorative molding portion is elongated and has first and second ends, and in which said ends of the hollow, gas-filled, interior are closed by parts of the sealing lip.

10. A weatherstrip according to claim 1, in which the hollow, gas-filled, interior of the decorative molding portion is elongated and has first and second ends, and in which said ends of the hollow, gas-filled, interior are closed by parts of the sealing lip.

* * * * *